Figure 1:
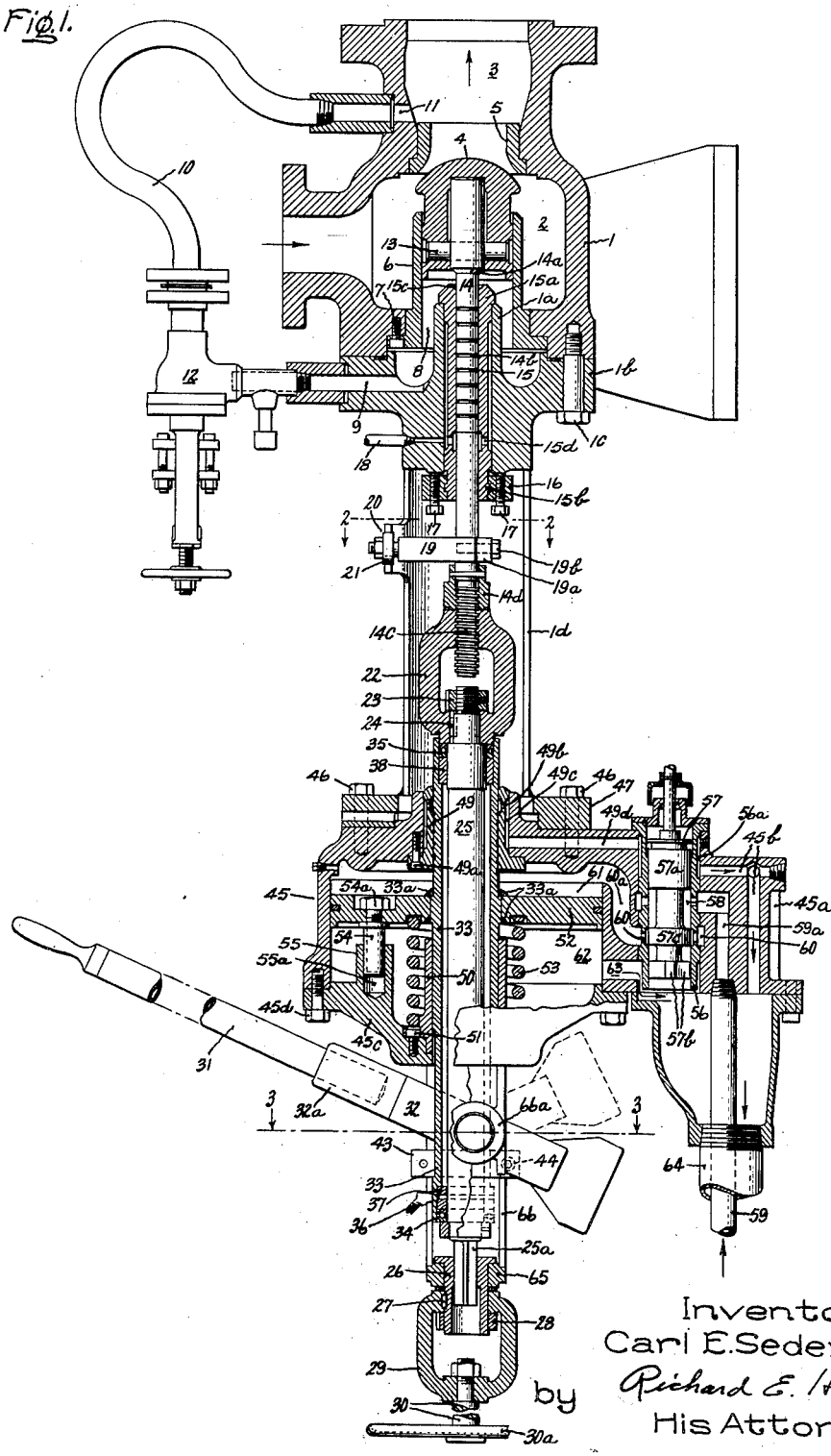

Dec. 23, 1952

C. E. SEDERQUIST 2,622,617

VALVE FOR CONTROLLING MARINE STEAM TURBINES

Filed April 10, 1952

2 SHEETS—SHEET 1

Inventor:
Carl E. Sederquist,
by Richard E. Hosley
His Attorney.

Dec. 23, 1952 C. E. SEDERQUIST 2,622,617
VALVE FOR CONTROLLING MARINE STEAM TURBINES
Filed April 10, 1952 2 SHEETS—SHEET 2
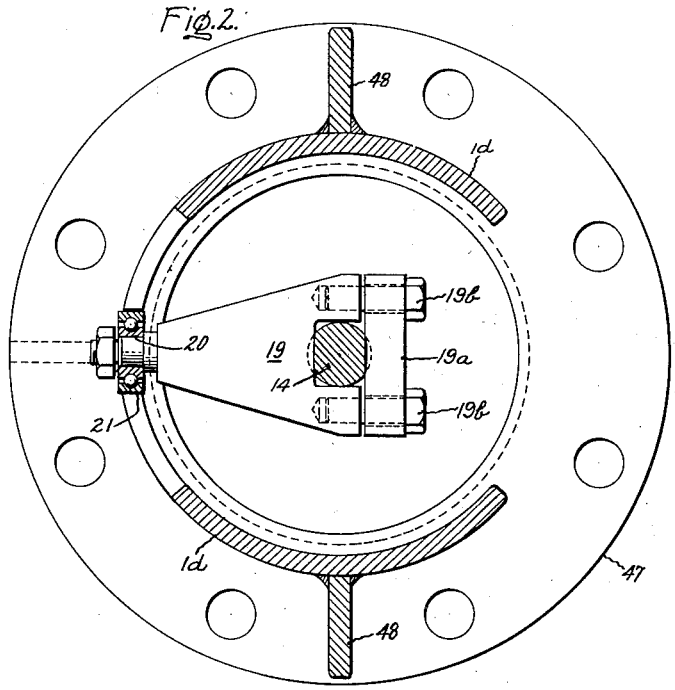
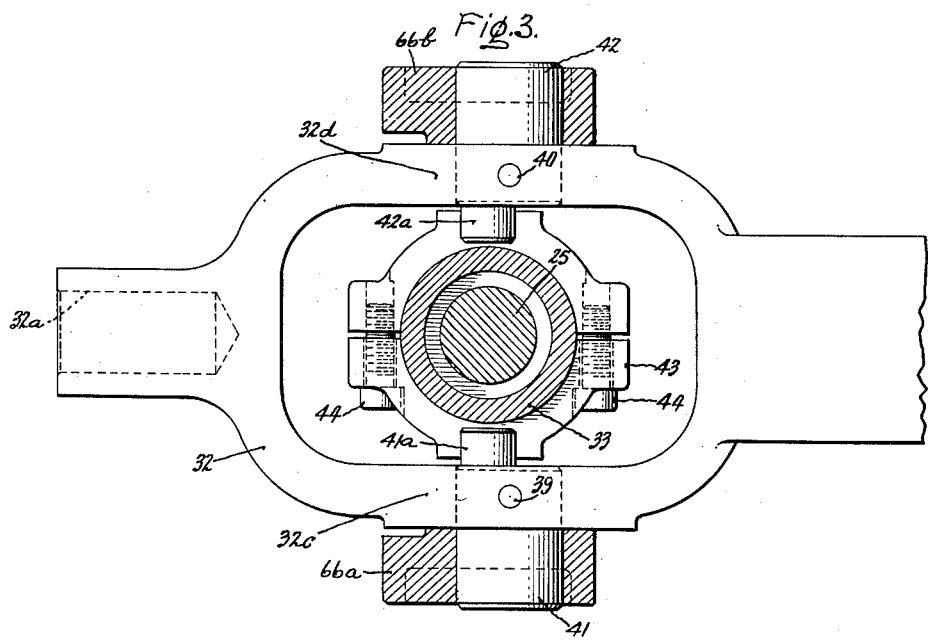
Inventor:
Carl E. Sederquist,
by Richard E. Hosley
His Attorney.

Patented Dec. 23, 1952

2,622,617

UNITED STATES PATENT OFFICE 2,622,617

VALVE FOR CONTROLLING MARINE STEAM TURBINES

Carl E. Sederquist, Melrose, Mass., assignor to General Electric Company, a corporation of New York Application April 10, 1952, Serial No. 281,695

5 Claims. (Cl. 137—641)

This invention relates to valves for controlling the flow of an elastic fluid such as steam, particularly to a valve for governing a marine steam turbine.

In normal operation, marine turbines are ordinarily governed by a steam valve positioned automatically by a hydraulic servo-motor. In the event of an emergency over-speed condition, the oil is dumped from the servo-motor, permitting the valve to close quickly. For accurate maneuvering at slow speed, as when entering or leaving a port, it is usually desired to control the turbine by hand.

The purpose of the present invention is to provide an improved governing and maneuvering valve for a marine turbine having multiple actuating means for positioning the valve in normal operation and for providing the required manual control for maneuvering.

A further object is to provide a governing valve of the type described which is simple and rugged, so as to be sufficiently foolproof to provide the accurate governing and emergency control features required in a marine turbine powerplant.

Another object is to provide a marine turbine governing valve having auxiliary manual control means by which the valve stem may be forcibly freed in the event of any tendency to stick in its guide bushings, or for opening the valve for emergency operation in the event of failure of the hydraulic servo mechanism.

Other objects and advantages will become apparent from the following description, taken in connection with the accompanying drawings in which Fig. 1 is a sectional view of a marine turbine governing valve having multiple actuating means in accordance with the invention, Fig. 2 is a transverse section of a detail taken on the plane 2—2 in Fig. 1, and Fig. 3 is a transverse sectional detail view taken on the plane 3—3 in Fig. 1.

Generally, the invention is practiced by providing an actuating spindle rotatably supported in a tube adapted to be positioned longitudinally by a hydraulic piston secured thereto. First and second manual positioning means are provided, one being means for rotating the spindle, and the other being a jacking handle for slidably positioning the tube.

Referring now more particularly to Fig. 1, the invention is shown as applied to a steam control valve including a housing 1 defining an inlet chamber 2 and a discharge chamber 3. The flow control member comprises a valve disk or head assembly 4, having an end portion adapted to seat on the Venturi seat member 5, and an outer circumferential portion adapted to slide axially in a cylindrical bushing 6 secured in housing 1 by suitably threaded fastenings 7. It will be seen that bushing 6 and the piston member 4 define a closed chamber 8 which communicates by way of a port 9 and an external bypass conduit 10 with a port 11 at the downstream side of the valve. Bypass conduit 10 contains a manually actuated valve 12, the function of which is to bleed fluid from the chamber 8 so as to equalize the pressure drop across the piston member 4 and thereby reduce the force required to open the valve against full inlet steam pressure. When the turbine is shut down, valve 12 would of course be closed.

The flow control piston 4 is connected by means of a transverse pin 13 to the end of longitudinally slidable valve stem 14. It will be seen that stem 14 is carried in a bushing 15 which has an inner end portion 15a adapted to seat against the end of tubular housing portion 1a. A split retaining collar 16, the two halves of which are held together by suitable screws (not shown), is secured about an outer end flange 15b, which is of course of such an outside diameter that the bushing 15 can be inserted in housing portion 1a from the inner end thereof. Bushing 15 is securely fastened in place by a plurality of jacking screws 17, which are threadedly received in the collar 16 and abut against the adjacent end portion of housing 1.

It will also be observed from Fig. 1 that the housing 1 comprises a main body portion with a removable head 1b secured to the body by a plurality of threaded fastenings 1c.

It is also to be noted that leakage of steam along the stem 14 is prevented when the flow control head 4 is in wide open position by reason of the engagement of a conical seat 14a formed on the stem, with a cooperating seat 15c formed on the adjacent end of bushing 15. Any steam which does leak along the stem is removed by way of ports 15d and a drain conduit 18. A plurality of circumferential grooves 14b in stem 14 serve to further limit the leakage of steam along the stem, as will be understood by those skilled in the art.

Valve stem 14 is prevented from rotating by means of a yoke member 19 which is clamped to the stem by a removable end portion 19a secured to the arm 19 by a pair of screws 19b, in a manner which will be more clearly apparent from the detail view shown in Fig. 2. Here it will be seen that the yoke has flat surfaces engaging opposed flat portions on the stem. The extreme end portion of yoke 19 carries an antifriction bearing 20, the outer race of which rolls in an axial direction on spaced parallel guide portions 21, which guides are part of the enclosing cylindrical housing wall 1d, the latter being formed integrally with or welded to the valve housing head member 1b. As will be seen in Fig. 2, the cylindrical housing portion 1d is cut away at diametrically opposite portions thereof, except for the portions 21 which extend circumferentially to form the axial guide means for the roller member 20. It will be clear that the valve stem 14 is thus free to slide axially without rotation.

The primary manual control means for positioning the valve stem comprises a rotatable yoke member 22 threadedly engaging the adjacent end portion 14c of the stem. Since arm 19 prevents rotation of the stem, it will be apparent that rotation of yoke 22 will cause the stem 14 to move axially. Yoke 22 is secured by a retaining nut 23 and a key 24 to the adjacent end of the primary actuating spindle 25. The lower end of spindle 25 is provided with a square section 25a adapted to slide longitudinally in a bushing 26, which of course has a longitudinal bore of square cross-section. Bushing 26 is secured by a key 27 and retaining nut 28 so as to be rotated by a yoke 29, which is adapted to be connected by an actuating shaft 30 to suitable means for rotating the yoke at will, represented diagrammatically by the handwheel 30a. This rotating means could of course be a remotely controlled positioning motor, or a remote handwheel connected by suitable gearing to the shaft 30.

The secondary manual actuating means comprises a "jacking" handle 31 adapted to be inserted in a socket 32a formed in the end of a yoke member 32, the plan shape of which is shown more clearly in Fig. 3. It will be apparent that the parallel spaced side portions 32c, 32d of the yoke pass on opposite sides of a tube 33 which coaxially surrounds the primary actuating spindle 25. It will be apparent from Fig. 1 that spindle 25 is rotatably supported in tube 33 by means of anti-friction thrust bearings 34, 35 and journal bearings 37, 38 at the lower and upper ends respectively of tube 33. The lower end of the tube also carries a grease fitting 36 communicating with suitable lubricant distributing passages in the bronze journal bearing 37 located inside the sleeve. Although not shown, similar lubricating means are provided for thrust bearing 35, journal bearing 38 and threaded stem portion 14c.

Returning now to Fig. 3, it will be observed that the yoke portions 32c, 32d have secured therein, as by dowel pins 39, 40 a pair of opposed trunnion members 41, 42, each having an eccentrically disposed inwardly projecting cylindrical portion 41a, 42a respectively. These end portions are adapted to engage the upper transverse end surfaces of a split collar 43 which is clamped around a shoulder on tube 33 by a pair of diametrically spaced machine screws 44.

The hydraulic servo-motor for positioning the valve in normal operation comprises a housing 45 having formed integrally therewith an auxiliary pilot valve housing 45a. Housing 45 is secured by threaded fastening 46 to a flange 47 welded to the lower end of the cylindrical valve housing walls 1d. It will be seen in Fig. 2 that there are a pair of diametrically spaced ribs or webs 48 welded to the housing portions 1d and flange 47, so the members 1d, 47, 48 form a rigid bracket supporting the hydraulic motor housing 45 relative to the valve housing head member 1b.

Referring again to Fig. 1, it will be seen that the tube 33 is slidably disposed in an upper bushing 49 secured in housing 45 by threaded fastenings 49a. Another axially spaced bushing 50 is secured by machine screws 51 to an end closure member 45c, which is in turn held by threaded fastenings 45d to the motor housing 45.

Secured to tube 33, as by welding at 33a, is a motor piston member 52. This piston is strongly biased upwardly by a main coil spring 53 disposed around the bushing 50, and is prevented from rotating by an axially projecting dowel pin 54 secured in the piston by a retaining nut 54a. This dowel pin engages suitable guide members formed in the housing, which may take the form of a boss 55 having an axially disposed hole 55a receiving the dowel pin. Axial movement of piston 52 downward is limited by bushing 50; but the piston always remains clear of bushing 49 to permit closing of valve 4 under any condition.

The pivot valve housing 45a defines an axial bore containing a bushing 56 with a longitudinally slidable pilot valve plunger 57. As will be apparent from Fig. 1, pilot valve 57 defines an annular supply chamber 58 which is in constant communication with an inlet conduit 59 by way of a drilled passage 59a. Pilot valve 57 is guided by an upper cylindrical portion 57a and, at the lower end thereof, by a plurality of radially extending arms 57b. The flow controlling portion of pilot 57 is an annular land 57c which is normally maintained in aligned position relative to the outlet ports 60. Ports 60 communicate with the chamber 61 above piston 52 by way of a cored passage 60a. Any liquid leaking past piston 52 into the lower chamber 62 passes by way of a drain port 63 to drain conduit 64, which preferably surrounds the high pressure inlet conduit 59. This arrangement has the advantage that any fluid leaking from the high pressure supply conduit 59 will be carried harmlessly to drain, thus preventing the possibility of oil escaping and contacting surfaces hot enough to cause ignition.

It will be appreciated by those familiar with hydraulic servo-motor art that movement of pilot member 57 downwardly causes the land 57c to admit high pressure liquid from supply chamber 58 to the chamber 61 above piston 52 so that the piston is caused to move downwardly against the bias of spring 53. Conversely, movement of pilot member 57 upwardly causes liquid to drain from the chamber 61, whereupon spring 53 moves the piston upwardly.

The hydraulic pilot valve will of course be provided with suitable operating linkage, including a follow-up connection to the valve stem, but such details are not shown because not believed material to an understanding of the present invention.

It will also be noted that any operating liquid which leaks along the outer surface of tube 33 past bushing 49 will be drained by way of ports 49b through an annular passage 49c defined between bushing 49 and the adjacent housing wall, thence by way of a drain conduit 49d to an annular passage 56a formed in the outer circumference of bushing 56, and to drilled passage 45b in the pilot valve housing 45a. It will be seen that spent operating liquid and all leakage in the hydraulic motor is thus safely conducted to the drain conduit 64.

It remains to note that the actuating yoke 29, with the rotatable bushing 26, are carried in a journal bearing 65 which is secured to or formed integral with axially extending bracket members 66, the other ends of which are integral with end closure member 45c. The jack yoke 32 is supported on these bracket members 66 by a pair of diametrically opposed boss members 66a, 66b, as may be seen in Fig. 3. Since the larger diameter trunnion portions 41, 42 are journaled in bracket portions 66a, 66b in eccentric relation to the smaller diameter trunnion portions 41a, 42a, rotation of the yoke 32 about trunnions 41, 42 will cause the eccentric members 41a, 42a to act on the thrust collar 43 to move tube 33 downwardly. Thus, it will be seen that, with the yoke 22 against stop collar 14d (that is, with valve 4 set for the wide open position in relation to piston 52), the tube 33 can be caused to slide downwardly, carrying the valve stem 14 with it, by means of the manual jacking handle 31 without the aid of hydraulic pressure in the motor 45. Obviously, absence of hydraulic pressure will place the valve 4 and piston 52 in their full upward position which will permit the manual jacking procedure. Thus, the valve stem may be freed of any tendency to stick, as for instance after a long shut-down, or the valve may be opened for emergency control in the event of failure of the hydraulic actuating mechanism.

The stop collar 14d pinned to the threaded end portion of valve stem 14 engages the upper end surface of yoke 22 to limit manual actuation of the stem in the opening direction so that, with hydraulic pressure in the motor 45, valve stem portion 14a is against the bushing portion 15c and piston 52 is approximately ⅛" above bushing 50. This wide open setting of the valve 4 assures a positive stem seal, as this is the normal position of the steam valve while cruising.

It will be apparent from the above description of the structure that, for manual maneuvering, the handwheel 30a is actuated to rotate the inner spindle 25 so that stem positioning yoke 22 causes the threaded valve stem portion 14c to descend, to move the valve stem in the opening direction. This provides manual positioning of the steam control valve, and yet the governing system (not shown) is always free to close the steam valve should the turbine overspeed. For normal cruising operation, the valve 4 is held wide open by hydraulic piston 52 under the control of pilot 57 and the hydraulic governing system. The jacking handle 31 is inserted in socket 32a only when sticking of the valve stem or other emergency condition requires fast and positive positioning of the valve stem.

Thus, it will be seen that the invention provides a rugged threeway actuating mechanism for a marine turbine valve, the hydraulic motor providing automatic control in normal operation, the primary manual control being used for maneuvering around port, with the secondary manual actuator reserved for emergency service. These three actuators are in a sense dependent upon each other for positioning the steam valve. For example:

1. If the hydraulic piston 52 is against the bottom stop 50, with the valve 4 set in the closed position by handwheel 30a, the hydraulic piston cannot move the steam valve.

2. If the hydraulic pressure should fail with the piston in the position described above, the steam valve 4 cannot be opened by handwheel 30a, because spring 53 will drive the piston upward, as the handwheel is rotated, keeping the steam valve in the closed position.

3. Only when hydraulic pressure is holding the piston down, or in some intermediate position, is it possible to open the steam valve by means of handwheel 30a.

4. The jacking handle 31 is effective only for opening the steam valve 4 when the valve is closed and the piston 52 is in the upward position, until the yoke 22 is in contact with stop collar 14d, thus permitting collar 43 to come in contact with eccentric pins 41a and 42a. The jacking handle can open the steam valve only about one quarter of its normal total stroke. Therefore, it is necessary to set the steam valve in its normal wide open position, as related to the piston, in order to effectively jack the steam valve open.

As indicated above, during normal operation, the valve 4 is wide open, with the steam seal shoulder 14a seated on the conical seat 15c, so as to prevent steam leakage along the stem, and the yoke 22 against stop nut 14d with piston 52 about ⅛" away from bushing member 50. With this arrangement, hydraulic pressure on top of piston 52 positively forces the steam seal shoulder 14a against its seat 15c.

With hydraulic pressure holding piston 52 in its lowermost position, valve 4 may be positioned by manually rotating handwheel 30a, for starting and maneuvering the ship around port. Failure of the hydraulic pressure permits spring 53 to move the tube 33 upwardly to close steam valve 4.

While only one form of the invention has been described completely herein, it will be appreciated by those skilled in the art that many changes and substitutions of mechanical equivalents may be made without departing from the invention. It is of course intended to cover by the appended claims all such modifications as fall within the true spirit and scope of the invention.

What I claim as new and desire to secure by Letters Patent of the United States is:

1. In multiple actuating mechanism for a valve having a stem disposed for longitudinal sliding movement without rotation, the combination of a rotatable stem positioning yoke member threadedly engaging an end portion of the valve stem whereby rotation of the yoke effects longitudinal movement of the stem, hydraulic motor means for positioning said yoke longitudinally irrespective of rotational displacement thereof, said hydraulic motor comprising a housing, a slidable tube member disposed through guide bushings in opposite walls of the housing, a hydraulic piston member slidably disposed in the housing and secured to said tube, spring means disposed in the housing and biasing the piston to one extreme of its range of movement, hydraulic pilot means adapted to supply operating liquid under pressure for moving the piston to the opposite end of its range of movement against the bias of the spring, guide means for preventing rotation of said tube and piston relative to the housing, an actuating spindle member disposed coaxially within said tube, axially spaced bearing means disposed between tube and spindle whereby the spindle may rotate within the tube irrespective of longitudinal displacement thereof relative to said housing, means connecting one end of the spindle with said stem positioning yoke whereby rotation of the spindle causes the yoke to position the threaded valve stem axially whereas longitudinal sliding movement of the tube positions the yoke and valve stem irrespective of rotational movement of the spindle, primary manual actuating means connected to the end of the spindle remote from said yoke and adapted to rotate the spindle to position the valve stem, and secondary manual actuating means connected to position said tube axially independently of said primary means.

2. In multiple actuating mechanism for a valve having a stem disposed for longitudinal sliding movement without rotation, the combination of a rotatable stem positioning member threadedly engaging an end portion of the stem, hydraulic motor means for positioning said member comprising a housing defining a hydraulic cylinder, a slidable tube disposed through guide bushings in opposite walls of the housing, a piston slidably disposed in the housing and secured to said tube, hydraulic pilot means adapted to supply operating liquid under pressure to the piston for positioning it in the cylinder, guide means for preventing rotation of the tube and piston relative to the housing, an actuating spindle rotatably disposed coaxially within the tube, means connecting one end of the spindle with said stem positioning member, whereby rotation of the spindle causes said member to position the threaded valve stem axially whereas longitudinal sliding movement of the tube in its guide bushings positions the valve stem irrespective of rotational movement of the spindle, primary actuating means connected to the end of the spindle remote from the stem and adapted to rotate the spindle to position the stem, and secondary actuating means connected to position said tube axially independently of said primary means and without the aid of the hydraulic motor.

3. Multiple actuating mechanism in accordance with claim 2 in which the secondary actuating means comprises a jacking yoke member having spaced parallel side portions disposed at opposite sides of the slidable tube, first pivot bearing means supporting the jacking yoke for oscillation through a limited arc about an axis normal to the tube, said tube having a member forming diametrically opposed abutment surfaces, the jacking yoke having a pair of opposed trunnion members projecting inwardly to engage said abutment surfaces and being disposed eccentric relative to said pivot bearing means, whereby arcuate movement of the jacking yoke effects engagement of the trunnions with said abutment surfaces to position the tube longitudinally.

4. Multiple actuating mechanism in accordance with claim 2 in which the primary actuating means comprises a rotatable bushing having a longitudinal bore adapted to engage the end of the actuating spindle remote from the valve stem and including axial guide means for effecting longitudinal sliding movement between the spindle and bushing without relative rotation therebetween, and means connected to rotate said bushing whereby the spindle is caused to rotate to position the valve stem.

5. In multiple actuating mechanism for a valve or like device having a stem disposed for longitudinal sliding movement without rotation, the combination of a rotatable stem positioning member threadedly engaging an end portion of the stem, linear actuating means for positioning said member comprising a housing, a slidable tube disposed through guide bushings in opposite walls of the housing, motor means in said housing for positioning the tube longitudinally, guide means for preventing rotation of the tube relative to the housing, an actuating spindle rotatably disposed coaxially within the tube, means connecting one end of the spindle with said stem positioning member, whereby rotation of the spindle causes the member to position the stem axially whereas longitudinal sliding movement of the tube in its guide bushings positions the stem irrespective of rotational movement of the spindle, and second actuating means connected to the end of the spindle remote from the stem and adapted to rotate the spindle to position the stem irrespective of said motor means.

CARL E. SEDERQUIST.

No references cited.